(12) United States Patent
Hay et al.

(10) Patent No.: US 11,216,435 B2
(45) Date of Patent: *Jan. 4, 2022

(54) TECHNIQUES AND ARCHITECTURES FOR MANAGING PRIVACY INFORMATION AND PERMISSIONS QUERIES ACROSS DISPARATE DATABASE TABLES

(71) Applicant: salesforce.com, inc., San Francisco, CA (US)

(72) Inventors: Marla Hay, Portland, OR (US); Yu Chen, Bellevue, WA (US); Michael Allan Friedman, San Francisco, CA (US); Yvonne Zhou, San Francisco, CA (US); Shivan Kaul Sahib, Vancouver (CA)

(73) Assignee: salesforce.com, Inc., San Francisco, CA (US)

( * ) Notice: Subject to any disclaimer, the term of this patent is extended or adjusted under 35 U.S.C. 154(b) by 153 days.

This patent is subject to a terminal disclaimer.

(21) Appl. No.: 16/140,428

(22) Filed: Sep. 24, 2018

(65) Prior Publication Data

US 2020/0097574 A1 Mar. 26, 2020

(51) Int. Cl.
*G06F 16/22* (2019.01)
*G06F 21/62* (2013.01)
*G06F 16/248* (2019.01)
*G06F 16/2455* (2019.01)

(52) U.S. Cl.
CPC ........ *G06F 16/2282* (2019.01); *G06F 16/248* (2019.01); *G06F 16/2455* (2019.01); *G06F 21/6263* (2013.01)

(58) Field of Classification Search
CPC ............... G06F 16/2282; G06F 16/248; G06F 16/2455; G06F 21/6263; G06F 16/24561; G06F 21/604
See application file for complete search history.

(56) References Cited

U.S. PATENT DOCUMENTS

| 5,577,188 A | 11/1996 | Zhu |
| 5,608,872 A | 3/1997 | Schwartz et al. |
| 5,649,104 A | 7/1997 | Carleton et al. |

(Continued)

OTHER PUBLICATIONS

Non-Final Office Action for U.S. Appl. No. 16/139,619 dated Jun. 30, 2020, 10 pages.

(Continued)

*Primary Examiner* — Meng Li
(74) *Attorney, Agent, or Firm* — Kwan & Olynick LLP

(57) ABSTRACT

At least one database table of denormalized values corresponding to selected values of field properties in records across multiple disparate tables of the database environment is maintained. A structured query is received through a structured query language application program interface (API). The structured query to request a listing of records across the multiple disparate tables of the database environment. The database table is searched for indications corresponding to records across the multiple disparate tables of the database environment corresponding to the selected values indicating communication with a specified party. A listing of records from across the multiple disparate tables that satisfy the selected values is returned through the structured query language API.

18 Claims, 6 Drawing Sheets

(56) References Cited

U.S. PATENT DOCUMENTS

| | | |
|---|---|---|
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,289,976 B2 | 10/2007 | Kihneman et al. |
| 7,340,411 B2 | 3/2008 | Cook |
| 7,620,655 B2 | 11/2009 | Larsson et al. |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachadran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0036586 A1* | 2/2006 | Krakowiecki ........ G06F 16/951 |
| 2007/0124276 A1* | 5/2007 | Weissman ......... G06F 16/24575 |
| 2009/0177744 A1 | 7/2009 | Marlow et al. |
| 2011/0082854 A1* | 4/2011 | Eidson ............... G06F 16/2462 |
| | | 707/714 |
| 2015/0058314 A1* | 2/2015 | Leclerc ............... H04L 63/0815 |
| | | 707/711 |
| 2015/0121545 A1* | 4/2015 | Chandrasekaran ... G06F 16/284 |
| | | 726/27 |
| 2016/0104002 A1* | 4/2016 | Schneider ............ H04L 63/102 |
| | | 726/1 |
| 2016/0105442 A1* | 4/2016 | Movida ................ H04L 65/403 |
| | | 726/28 |
| 2017/0213272 A1 | 7/2017 | Mowatt et al. |
| 2018/0070144 A1* | 3/2018 | Tang ................ H04N 21/47202 |
| 2018/0213364 A1* | 7/2018 | Segal ..................... H04W 4/33 |
| 2018/0248881 A1 | 8/2018 | Mueller et al. |
| 2020/0097680 A1 | 3/2020 | Hay et al. |

OTHER PUBLICATIONS

Final Office Action for U.S. Appl. No. 16/139,619 dated Dec. 11, 2020, 9 pages.

Non-Final Office Action for U.S. Appl. No. 16/139,619 dated Mar. 26, 2021, 10 pages.

* cited by examiner

TECHNIQUES AND ARCHITECTURES FOR MANAGING PRIVACY INFORMATION AND PERMISSIONS QUERIES ACROSS DISPARATE DATABASE TABLES

TECHNICAL FIELD

Embodiments relate to techniques and architectures for providing efficient privacy and data governance functionality in a complex computing environment having multiple database objects connected to a single entity (e.g., person, position) each of which can have associated privacy and data governance characteristics and parameters. More particularly, embodiments relate to techniques and architectures for accurate and efficient evaluation of privacy and data governance mechanisms corresponding to multiple database objects.

BACKGROUND

Computing environments that manage data related to multiple entities (e.g., people, groups, companies, positions, archives) can quickly become complex. For example, within a small office setting an employee may have an employee profile managed by the human resources department and that employee may also have an individual contact entry in a shared contacts database/app/tool. Each of these objects can have different associated permissions, uses, privacy requirements, access rights, etc. In order to operate property and efficiently these should be handled consistently and correctly. Current solutions to this situation are error-prone and cumbersome.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

In the following description, numerous specific details are set forth. However, embodiments of the invention may be practiced without these specific details. In other instances, well-known structures and techniques have not been shown in detail in order not to obscure the understanding of this description.

Various data control, privacy, data governance, data management techniques, structures and mechanisms are described herein. Many examples are presented in terms of privacy permissions and associated principles. However, the techniques and architectures describe herein are more broadly applicable and should not be limited to privacy and data governance.

In various embodiments, an application program interface (API) can be provided that returns user records that match specific privacy criteria (e.g., all records that allow email contact). In one embodiment, related privacy values are denormalized into a database table to provide real-time privacy information. Described herein are techniques and patterns for initial population of denormalized data to ensure complete initial data. Once populated, decisions can be made via, for example, resolving logic that accounts for privacy values and user data. This allows a dynamic structured query to read to single or multiple entities and corresponding multiple consent values. In one embodiment, the greatest privacy principle is used to help ensure compliance with data governance regulations.

Figure 1:
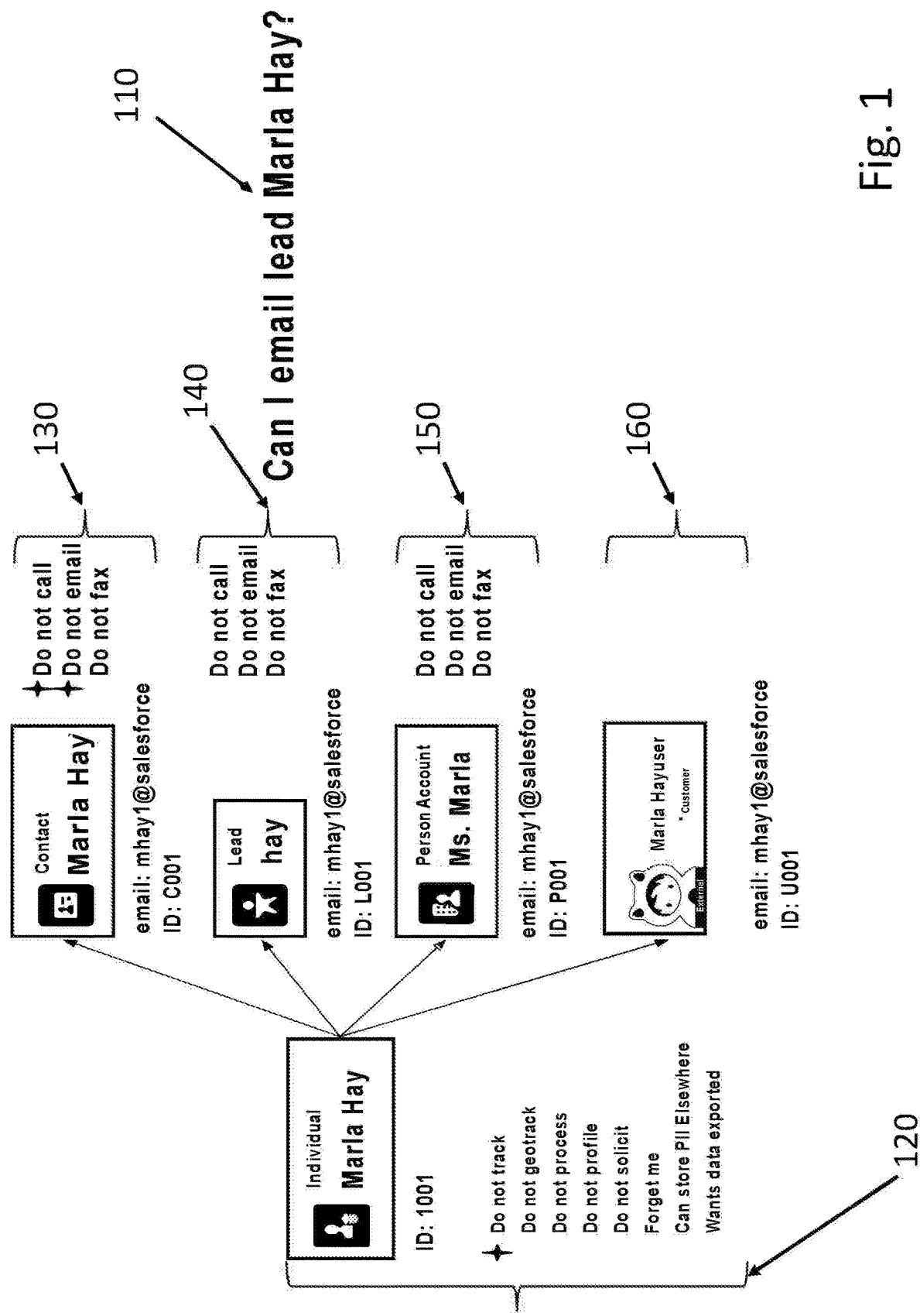
FIG. 1 is a conceptual illustration of a setting in which a privacy inquiry can be evaluated.

FIG. 1 is a conceptual illustration of a setting in which a privacy inquiry can be evaluated. The example of FIG. 1 provides a specific use case based on an inquiry about a proposed communication. However, as discussed above, this is just one example of the techniques described herein. Similar techniques can be utilized, for example, to manage personally identifiable information (PII) or other data management operations. Further, the example of FIG. 1 illustrates how multiple objects can be related to a single contact method/entity/etc.

The example of FIG. 1 considers inquiry 110 ("Can I email lead Marla Hay?"). This type of inquiry may be, for example, the result of the normal course of work for a person in sales that would like to follow up with a contact about a potential sale. The contact may be associated with multiple objects within a customer relationship management (CRM) environment that the salesperson is accessing to manage the sales process.

The entity "Marla Hay" can be associated with multiple different objects across disparate database tables in the host environment. Each object can have an independent set of permissions, preferences and/or privacy rules. In the example of FIG. 1, Individual object 120 corresponds to Marla Hay and as an associated set of permissions, preferences and/or privacy rules (e.g., do not track, do not geotrack, do not process, do not profile, do not solicit, forget me, can store PII elsewhere, wants data exported). In the example of FIG. 1, the "Do Not Track" preference is selected.

Individual object 120 can be connected to one or more other objects that are linked to Marla Hay. For example, Contact 130, Lead 140, Person Account 150, Profile 160. As with Individual object 120, each contact can have its own set of permissions, preferences and/or privacy rules. Because these objects can be created or modified at different times, the corresponding permissions, preferences and/or privacy rules can be inconsistent. In the example of FIG. 1, "Do Not Call" and "Do Not Email" are selected for Contact 130, but not for Lead 140 or Person Account 150.

Thus, the answer to inquiry 110 can depend on which object(s) is/are checked. Using traditional techniques, a user making the inquiry would check one of the objects (e.g., Contact 130) and make a decision based on that object. If that person desired to be more through, they might check multiple objects (e.g., Contact 130 and Person Account 150), which would result in conflicting information. The techniques and architectures described herein can be utilized to provide a consistent and reliable response to these types of inquiries.

In one embodiment, the most restrictive result is utilized. In the example of FIG. 1, Contact 130 indicates "Do Not Email" so the answer to inquiry 110 is "No". In alternate embodiments, when conflicting permissions, preferences or privacy rules are found, the majority option is utilized, which would result in a "Yes" because only one of three "Do Not Email" options are selected. In another embodiment, the most recently updated version can be utilized.

When the inquiry becomes broader, for example, "Who can I contact by email?" the complexity and time required can grow very quickly. A straight forward strategy of "Can I email _____?" for a large population of target entities can quickly become too complex to answer in real time. Thus, the techniques and architectures described herein can be utilized to provide a real time (or near real time) response to those broader inquiries.

In the example of FIG. 1, consent information is stored in various objects, for example, Individual object 120, Contact object 130, Lead object 140, Person Account object 150. In alternate embodiments, other consent/privacy/object models can be utilized, for example, use of a Party object and Contact Channel Consent object that is linked to a party, Contact Point Consent object that is linked to a contact point and Contact Interest Consent object that is linked to a party. Many other structures and organizations can be utilized.

In this example, a party can be an organization (or business), an affiliate group, an individual. The channel type is the method of contact, for example, phone, email, app, address, location, social media. Contact point is a single contact handle for a corresponding contact channel.

Figure 2:
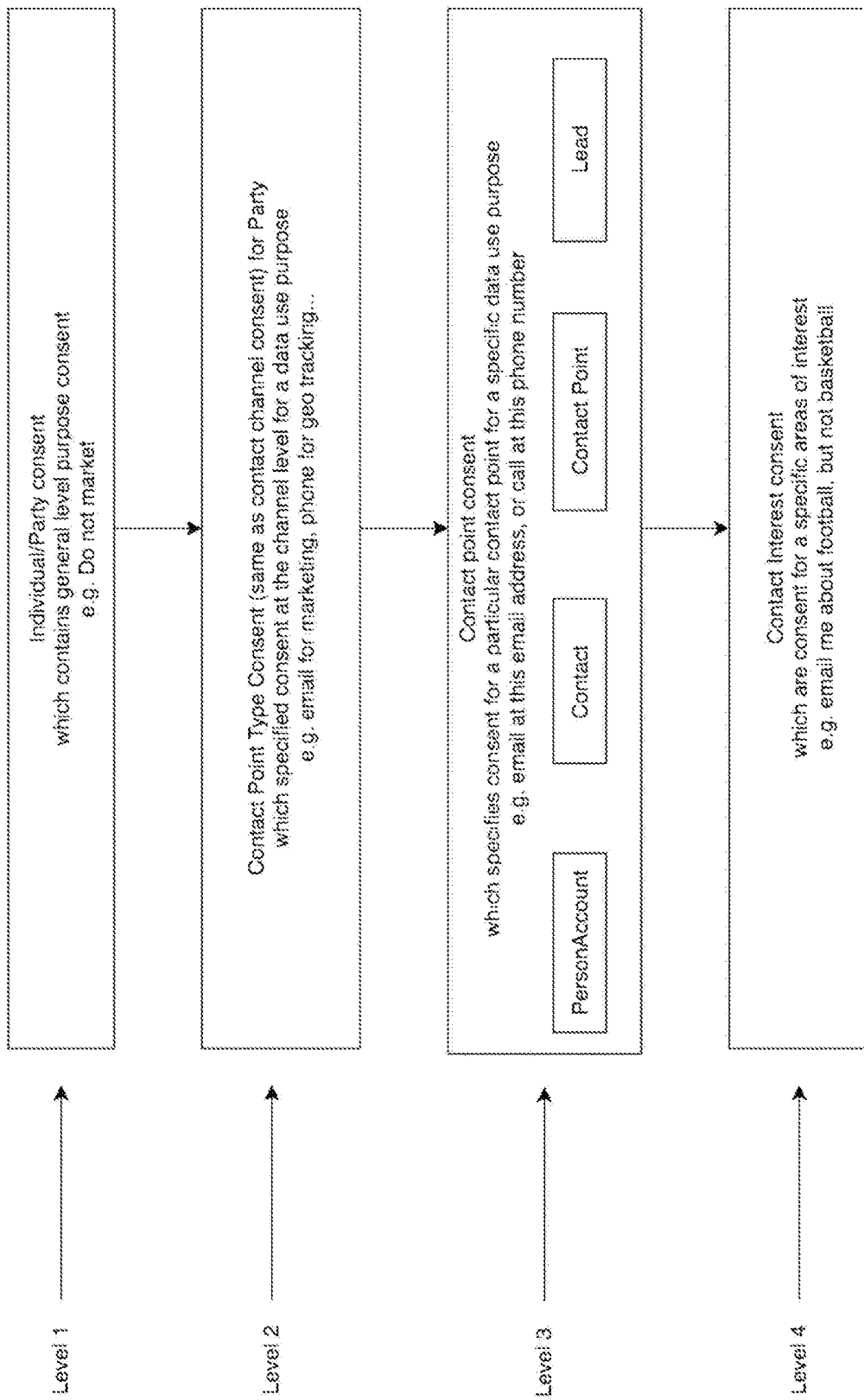
FIG. 2 is a flow diagram of one embodiment of a privacy inquiry process.

FIG. 2 is a flow diagram of one embodiment of a privacy inquiry process. In one embodiment, to determine consent for a person object (e.g., lead, contact, person account), a party or contact point, the following hierarchy of rules can be utilized. In one embodiment, once an opt out occurs, the process can be terminated. The following rule hierarchy is just one example of a rule hierarchy that can be utilized. More complex and/or different rule hierarchies can be used.

First (Level 1), check whether a party (organization/affiliate group/individual) has given consent for a general purpose ("Can I solicit this person?" or "Do Not Market"). Second (Level 2), check whether the party (organization/affiliate group/individual) has given consent for a specific channel ("Can I email this person?" or "Email for Marketing, Phone for Geotracking"). Third (Level 3), check whether the contact point/contact/lead linked to the party gave consent for a specific contact method ("Can I email this person at this email address?" or "Email at the Email Address and Call this Phone Number"). Fourth (Level 4), check whether the contact point has given consent for a specific interest ("Can I email this person about football?" or "Email me about football, but not about basketball").

In one embodiment, in order to improve query performance for retrieving consent values while resolving conflicts among these values, one or more consent summary tables can be maintained. Continuing with the example from above the table(s) can have the following columns: party_id (e.g. individual_id), source_id (person_object_id such as lead_id, contact_id or person_account_id, or contact_point_id), source_type_enum: integer enum to indicate source type, i.e. 0: Party, 1: Contact, 2: Lead, 3: PersonAccount, 4: ContactPoint, channel_type_enum_or_id: nullable, existing person objects have no support for channel, purpose_enum_or_id: nullable, in the future data model, party can have channel level consent without specify purpose, contact_point: email or contact point method. (For person objects such as contact, lead and person account, each email, phone, etc. will be turned into a row in this table), consent_value: aggregated consent value. (enum of 1: opt_in, 0: opt_out or 2: unknown, to be more flexible), and source_consent_value (enum of 1: opt_in, 0: opt_out or 2: unknown, to be more flexible).

In one embodiment, a transaction observer agent is provided to keep the table(s) current. In one embodiment, when an update occurs to any of the following tables: party, contact, lead, person account, contact channel consent, contact point consent, the original consent value can be updated and the aggregated consent value for linked rows in this summary table can also be updated. For example, if there an individual A that is linked to contact AC and lead AL: If contact A updated DoNotEmail to false, the original consent value for contact row and the aggregated consent value for contact and lead rows in the summary table(s) are updated.

As discussed above, the consent/privacy table(s) can be one or more denormalized tables, examples of which are provided below. First, a few example questions and corresponding database queries are provided. As a first example, the question "Did contact point 'xxx' opt out of tracking?" can be addressed with a query such as:
select consent_value
from consent_summary_denorm
where contact_point='xxx' and purpose_enum_or_id='tracking';
As another example, the question "Did individual 'xxx' opt out of email for tracking?" can be addressed with a query such as:
select consent_value
from consent_summary_denorm
where party_id='xxx' and channel_type_enum_or_id='email' and
purpose_enum_or_id='tracking');
The inquiry "Give me all the email contact points that have opt in to tracking" can be addressed with a query such as:
select contact_point
from consent_summary_denorm
where channel_type_enum_or_id='email' and purpose_enum_or_ id='tracking') and consent_value=1 and source_type_enum=4;
The inquiry "Give me the consent values of a specific list of person objects for email and tracking" can be addressed with a query such as:
select source_id, consent_value
from consent_summary_denorm
where source_id in ('xxx', 'yyy', 'mmm', . . . 'ooo') and channel_type_enum_or_id='email' and purpose_enum_or_id='tracking'); select source_id, consent_value from consent_summary_denorm
where source_id in ('xxx', 'yyy', 'mmm', . . . 'ooo') and channel_type_enum_or_id='email' and purpose_enum_or_id='tracking');

Thus, various embodiments provide a mechanism to determine a set of records that match specific privacy criteria by storing denormalized related privacy values in a database table, using a state machine pattern for initial population ensuring no incomplete data, and evaluating the data using map resolving logic that accounts for privacy values and user data. This allows a dynamic structured query to evaluate and return results based on multiple correlated privacy values. Maintaining a denormalized table of relevant privacy values allows for structured queries to provide near immediate results of determination of multiple related records across disparate database tables for records that meet criteria specified in the queries.

The following are example tables that can be utilized with the example queries below.

Individual:

| | id | name | Has Opted Out Geo-Tracking | Has Opted Out Processing | Has Opted Out Profiling | Has Opted Out Solicit | Has Opted Out Tracking | Can Store Pii Elsewhere | Should Forget |
|---|---|---|---|---|---|---|---|---|---|
| 1 | 0PK1 | Mary | t | t | t | t | t | f | t |
| 2 | 0PK2 | Adam | f | f | f | f | f | t | f |
| 3 | 0PK3 | John | t | t | t | t | t | t | t |

Contact:

| | id | first name | last name | email | DoNotCall | DoNotEmail | DoNotFax |
|---|---|---|---|---|---|---|---|
| 1 | 31 | Mary | Jane | mj@gmail.com | t | t | t |
| 2 | 32 | Adam | Jones | aj@gmail.com | f | f | f |
| 3 | 33 | John | Wayne | jw@gmail.com | t | t | t |
| 4 | 34 | Alice | Wonder | aw@gmail.com | f | f | f |

Lead:

| | id | first name | last name | email | DoNotCall | DoNotEmail | DoNotFax |
|---|---|---|---|---|---|---|---|
| 1 | 00Q1 | Mary | Jane | mjl@gmail.com | t | f | t |
| 2 | 00Q3 | John | Wayne | jw@gmail.com | t | t | t |
| 3 | 00Q4 | Bee | Happy | bh@gmail.com | f | f | f |

Contact Point:

| | contact point id | contact type | contact method (email address, name phone number, ...) | |
|---|---|---|---|---|
| 1 | 0CP1 | email | John | jw@gmail.com |
| 2 | 0CP2 | phone | John | 510-999-0000 |

Contact Channel Consent:

| | id | party id | status code (consent value) | capture channel |
|---|---|---|---|---|
| 1 | 1111 | 0PK3 | opt_in | email |

Contact Point Consent:

| | id | party id | contact point id | purpose | status code (consent value) | capture channel |
|---|---|---|---|---|---|---|
| 1 | 111 | 0PK3 | 0CP1 | tracking | opt_in | email |
| 2 | 222 | 0PK3 | 0CP1 | profile | opt_out | email |
| 3 | 333 | 0Pk3 | 0CP1 | processing | opt_in | email |

Consent Summary Denormalized Table:

| | party id | source id (person object id or contact point id) | source type enum | channel type enum or id | purpose enum or id | contact point e.g. email or contact point method | aggregated consent value | original consent value from legacy objects |
|---|---|---|---|---|---|---|---|---|
| 1 | 0PK3 | 0PK3 | 0 | email | | | opt_in | opt_in |
| 2 | 0PK3 | 0CP1 | 4 | email | tracking | jw@gmail.com | opt_in | opt_in |
| 3 | 0PK3 | 0CP1 | 4 | email | profiling | jw@gmail.com | opt_out | opt_out |
| 4 | 0PK3 | 0CP1 | 4 | email | processing | jw@gmail.com | opt_in | opt_in |
| 5 | 0PK1 | 31 | 1 | | email | mj@gmail.com | opt_out | opt_in |
| 6 | 0PK1 | 31 | 1 | | phone | mj@gmail.com | opt_in | opt_in |
| 7 | 0PK1 | 31 | 1 | | fax | mj@gmail.com | opt_in | opt_in |
| 8 | 0PK1 | 31 | 1 | | geoTracking | mjl@gmail.com | opt_in | opt_in |
| 9 | 0PK1 | 31 | 1 | | processing | mjl@gmail.com | opt_in | opt_in |
| 10 | 0PK1 | 31 | 1 | | profiling | mjl@gmail.com | opt_in | opt_in |
| 11 | 0PK1 | 31 | 1 | | solicit | mjl@gmail.com | opt_in | opt_in |
| 12 | 0PK1 | 31 | 1 | | tracking | mjl@gmail.com | opt_in | opt_in |
| 13 | 0PK1 | 31 | 1 | | piiElseWhere | mjl@gmail.com | opt_out | opt_out |
| 14 | 0PK1 | 31 | 1 | | shouldForget | mjl@gmail.com | opt_in | opt_in |
| 15 | 0PK1 | 00Q1 | 2 | | email | mjl@gmail.com | opt_out | opt_out |
| 16 | 0PK1 | 00Q1 | 2 | | phone | mjl@gmail.com | opt_in | opt_in |

-continued

| | party id | source id (person object id or contact point id) | source type enum | channel type enum or id | purpose enum or id | contact point e.g. email or contact point method | aggregated consent value | original consent value from legacy objects |
|---|---|---|---|---|---|---|---|---|
| 17 | 0PK1 | 00Q1 | 2 | | fax | mjl@gmail.com | opt_in | opt_in |
| 18 | 0PK1 | 00Q1 | 2 | | geoTracking | mjl@gmail.com | opt_in | opt_in |
| 19 | 0PK1 | 00Q1 | 2 | | processing | mjl@gmail.com | opt_in | opt_in |
| 20 | 0PK1 | 00Q1 | 2 | | profiling | mjl@gmail.com | opt_in | opt_in |
| 21 | 0PK1 | 00Q1 | 2 | | solicit | mjl@gmail.com | opt_in | opt_in |
| 22 | 0PK1 | 00Q1 | 2 | | tracking | mjl@gmail.com | opt_in | opt_in |
| 23 | 0PK1 | 00Q1 | 2 | | piiElseWhere | mjl@gmail.com | opt_out | opt_out |
| 24 | 0PK1 | 00Q1 | 2 | | shouldForget | mjl@gmail.com | opt_in | opt_in |
| 25 | 0PK2 | 32 | 1 | | email | aj@gmail.com | opt_out | opt_out |
| 26 | 0PK2 | 32 | 1 | | phone | aj@gmail.com | opt_out | opt_out |
| 27 | 0PK2 | 32 | 1 | | fax | aj@gmail.com | opt_out | opt_out |
| 28 | 0PK2 | 32 | 1 | | geoTracking | aj@gmail.com | opt_out | opt_out |
| 29 | 0PK2 | 32 | 1 | | processing | aj@gmail.com | opt_out | opt_out |
| 30 | 0PK2 | 32 | 1 | | profiling | aj@gmail.com | opt_out | opt_out |
| 31 | 0PK2 | 32 | 1 | | solicit | aj@gmail.com | opt_out | opt_out |
| 32 | 0PK2 | 32 | 1 | | tracking | aj@gmail.com | opt_out | opt_out |
| 33 | 0PK2 | 32 | 1 | | piiElseWhere | aj@gmail.com | opt_in | opt_in |
| 34 | 0PK2 | 32 | 1 | | shouldForget | aj@gmail.com | opt_out | opt_out |
| 35 | | | | | | | | |
| 36 | ... | | | | | | | |

As a first example, the inquiry "Can I email this individual and put a tracking pixel in the email?" can be addressed with the following query:
select consent_value from consent_summary_denorm where party_id='OPK1' and (purpose='email' or purpose='tracking');
This query will return 4 rows and the virtual entity will aggregate and return 'opt_out'.

As another example, the inquiry "Can I email this contact and put a tracking pixel in the email?" can be addressed with the following query:
select consent_value from consent_summary_denorm where source_id='31' and (purpose='email' or purpose='tracking');
This query will return 2 rows and the virtual entity will aggregate and return 'opt_out'.

As a final example, the inquiry "Can I send email to 'mj@hmail' and put a tracking pixel in the email?" can be addressed with the following query:
select consent_value from consent_summary_denorm where contact_point='mj@hmail' and channel='email' or purpose='tracking';
This query will return 2 rows and the virtual entity will aggregate and return 'opt_out'.

In one embodiment, consent values for columns in the denormalized consent table can be represented as a bit vector. In another embodiment, the consent values can be stored as an integer with each bit corresponding to a consent value. In another embodiment, the denormalized table can have the following indexes (with org id as the first column): individual id; legacy object id; UPPER (legacy object email); individual id, channel or data use name; legacy object id, channel or data use name; UPPER (legacy object email), channel or data use name; channel or data use name, UPPER (legacy object email).

Figure 3:
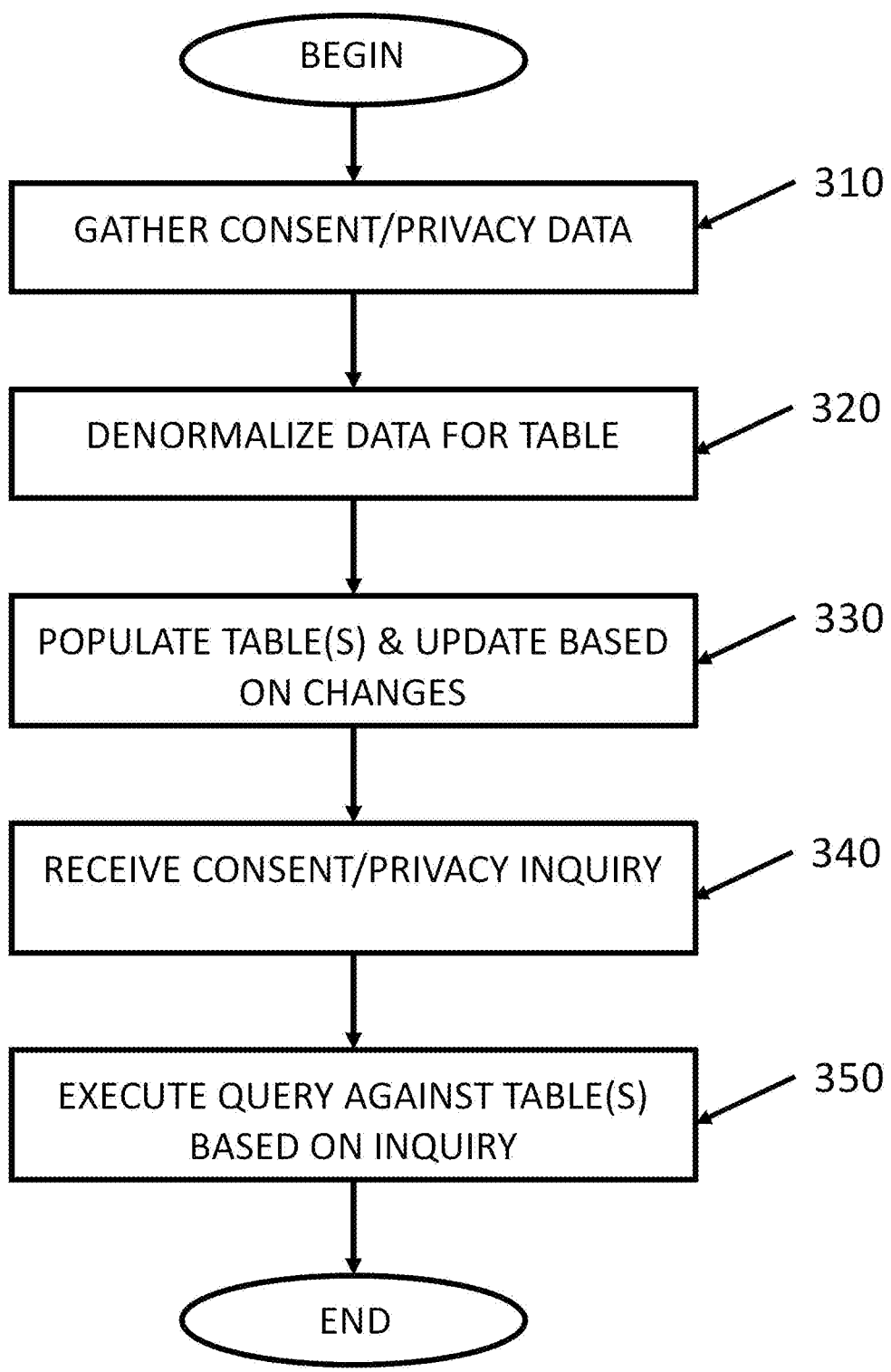
FIG. 3 is a flow diagram of one embodiment of a technique for managing a denormalized table for use in responding to privacy/consent inquires.

FIG. 3 is a flow diagram of one embodiment of a technique for managing a denormalized table for use in responding to privacy/consent inquires. Consent/privacy data is gathered, 310. As discussed above, any combination of database objects can have corresponding privacy/consent/permission/etc. values. The gathered data is denormalized, 320, for use in a table.

One or more tables can be populated (or updated if already populated) with the gathered data, 330. An inquiry can be received via the interface described herein, 340. A query is executed against the data in the table(s) in response to an inquiry, 350.

Figure 4:
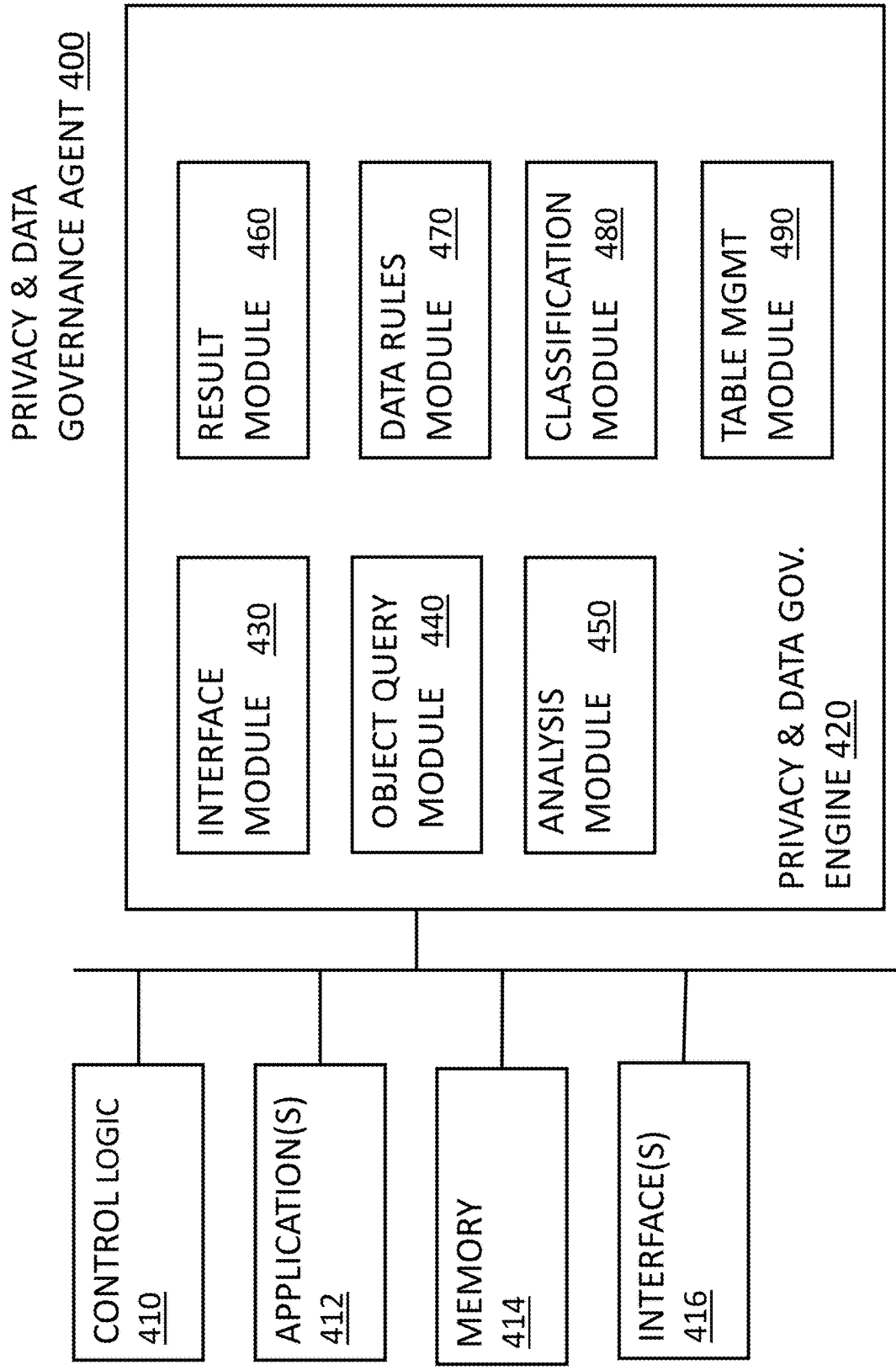
FIG. 4 is a block diagram of one embodiment of a privacy and data governance agent.

FIG. 4 is a block diagram of one embodiment of a privacy and data governance agent. In one embodiment, one or more privacy and data governance agents may exist and/or operate within the host environment. The agent of FIG. 4 may provide functionality as described, for example, with respect to FIGS. 1-3. The agent of FIG. 4 may also provide additional functionality.

In one embodiment, privacy and data governance agent 400 includes control logic 510, which implements logical functional control to direct operation of privacy and data governance agent 400, and/or hardware associated with directing operation of privacy and data governance agent 400. Logic may be hardware logic circuits and/or software routines. In one embodiment, privacy and data governance agent 400 includes one or more applications 412, which represent a code sequence and/or programs that provide instructions to control logic 410.

Privacy and data governance agent 400 includes memory 414, which represents a memory device and/or access to a memory resource for storing data and/or instructions. Memory 414 may include memory local to privacy and data governance agent 400, as well as, or alternatively, including memory of the host system on which privacy and data governance agent 400 resides. Privacy and data governance agent 400 also includes one or more interfaces 416, which represent access interfaces to/from (an input/output interface) privacy and data governance agent 400 with regard to entities (electronic or human) external to privacy and data governance agent 400.

Privacy and data governance agent 400 also includes privacy and data governance engine 420, which represents one or more functions or module that enable privacy and data governance agent 400 to provide the index backups as described above. The example of FIG. 4 provides several modules that may be included in privacy and data governance engine 420; however, different and/or additional modules may also be included. Example modules that may be involved in providing the privacy and data governance functionality described herein include, for example, interface module 530, object query module 540, analysis module 550, result module 560, data rule module 570, classification module 580 and table management module 590. Each of these modules may further include other sub-modules to provide other functions. As used herein, a module refers to routine, a subsystem, logic circuit, microcode, etc., whether implemented in hardware, software, firmware or some combination thereof.

In one embodiment, interface module 530 provides a standard interface that can be utilized to answer inquiries about privacy and/or data governance restrictions, preferences, classifications, etc. In one embodiment, interface module 530 provides utilizes at least an API to receive parameters related to a bulk consent/privacy inquiry. In alternate embodiments, interface module 530 can provide a different type of interface, for example, a natural language interface.

In one embodiment, object query module 540 operates to interpret the inquiry received from/through interface module 530 and functions to perform a query on one or more denormalized tables in a host environment. For example, object query module 540 could check one or more denormalized tables within the host environment for permissions, uses, privacy requirements, access rights, etc., corresponding to the inquiry.

In one embodiment, analysis module 550 operates on results from one or more queries performed by object query module 540 to determine if the proposed action is appropriate in response to analysis of the permissions, uses, privacy requirements, access rights of the various objects queried by object query module 540. In one embodiment, result module 560 generates a result from the analysis of analysis module 550 that can be communicated via interface module 530 to the source of the inquiry.

In one embodiment, data rule module 570 operates to maintain various rules for data management/governance. For example, data rules module 570 can maintain the classifications discussed above. As another example, data rule module 570 can maintain jurisdictional rules for various types of data (e.g., PII).

In one embodiment, classification module 580 operates to receive and/or communicate classification information related to various data fields. In one embodiment, table management module 590 operates to manage one or more denormalized tables related to the privacy and data governance activities described herein.

Various embodiments of the techniques herein can be provided within an on-demand services environment. The on-demand services environment can include a multitenant database environment to support multiple clients while maintaining privacy and data protection between clients. Various embodiments are described in greater detail below.

Figure 5:
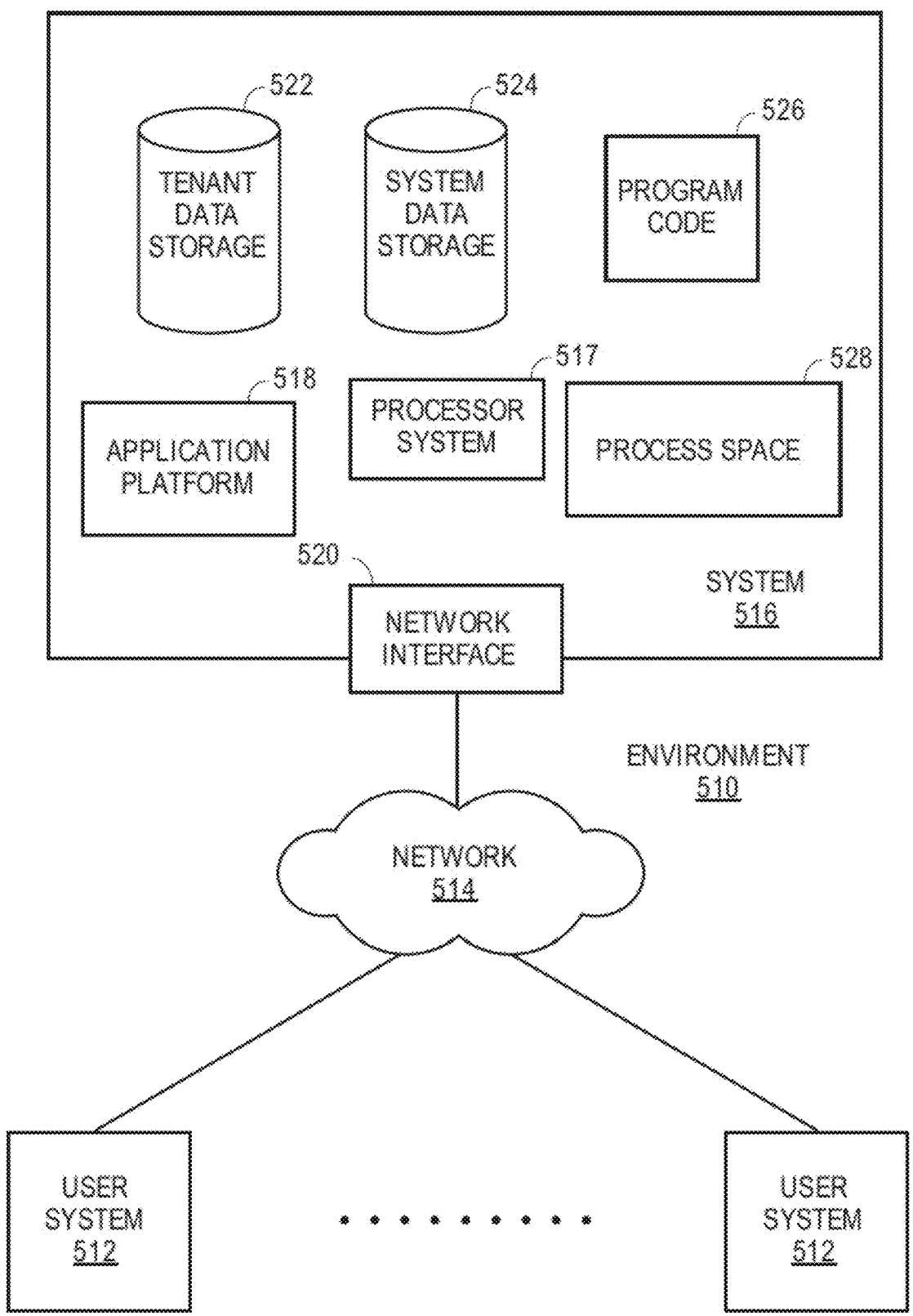
FIG. 5 illustrates a block diagram of an environment where an on-demand database service might be used.

FIG. 5 illustrates a block diagram of an environment 510 wherein an on-demand database service might be used. Environment 510 may include user systems 512, network 514, system 516, processor system 517, application platform 518, network interface 520, tenant data storage 522, system data storage 524, program code 526, and process space 528. In other embodiments, environment 510 may not have all of the components listed and/or may have other elements instead of, or in addition to, those listed above.

Environment 510 is an environment in which an on-demand database service exists. User system 512 may be any machine or system that is used by a user to access a database user system. For example, any of user systems 512 can be a handheld computing device, a mobile phone, a laptop computer, a work station, and/or a network of computing devices. As illustrated in herein FIG. 5 (and in more detail in FIG. 6) user systems 512 might interact via a network 514 with an on-demand database service, which is system 516.

An on-demand database service, such as system 516, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 516" and "system 516" will be used interchangeably herein. A database image may include one or more database objects. A relational database management system (RDMS) or the equivalent may execute storage and retrieval of information against the database object(s). Application platform 518 may be a framework that allows the applications of system 516 to run, such as the hardware and/or software, e.g., the operating system. In an embodiment, on-demand database service 516 may include an application platform 518 that enables creation, managing and executing one or more applications developed by the provider of the on-demand database service, users accessing the on-demand database service via user systems 512, or third party application developers accessing the on-demand database service via user systems 512.

The users of user systems 512 may differ in their respective capacities, and the capacity of a particular user system 512 might be entirely determined by permissions (permission levels) for the current user. For example, where a salesperson is using a particular user system 512 to interact with system 516, that user system has the capacities allotted to that salesperson. However, while an administrator is using that user system to interact with system 516, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 514 is any network or combination of networks of devices that communicate with one another. For example, network 514 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that one or more implementations might use are not so limited, although TCP/IP is a frequently implemented protocol.

User systems 512 might communicate with system 516 using TCP/IP and, at a higher network level, use other common Internet protocols to communicate, such as HTTP, FTP, AFS, WAP, etc. In an example where HTTP is used, user system 512 might include an HTTP client commonly referred to as a "browser" for sending and receiving HTTP messages to and from an HTTP server at system 516. Such an HTTP server might be implemented as the sole network interface between system 516 and network 514, but other techniques might be used as well or instead. In some implementations, the interface between system 516 and network 514 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 516, shown in FIG. 5, implements a web-based customer relationship management (CRM) system. For example, in one embodiment, system 516 includes application servers configured to implement and execute CRM software applications as well as provide related data, code, forms, webpages and other information to and from user systems 512 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 516 implements applications other than, or in addition to, a CRM application. For example, system 516 may provide tenant access to multiple hosted (standard and custom) applications, including a CRM application. User (or third party developer) applications, which may or may not include CRM, may be supported by the application platform 518, which manages creation, storage of the applications into one or more database objects and executing of the applications in a virtual machine in the process space of the system 516.

One arrangement for elements of system 516 is shown in FIG. 5, including a network interface 520, application platform 518, tenant data storage 522 for tenant data 523, system data storage 524 for system data 525 accessible to system 516 and possibly multiple tenants, program code 526 for implementing various functions of system 516, and a process space 528 for executing MTS system processes and tenant-specific processes, such as running applications as part of an application hosting service. Additional processes that may execute on system 516 include database indexing processes.

Several elements in the system shown in FIG. 5 include conventional, well-known elements that are explained only briefly here. For example, each user system 512 could include a desktop personal computer, workstation, laptop, PDA, cell phone, or any wireless access protocol (WAP) enabled device or any other computing device capable of interfacing directly or indirectly to the Internet or other network connection. User system 512 typically runs an HTTP client, e.g., a browsing program, such as Edge from Microsoft, Safari from Apple, Chrome from Google, or a WAP-enabled browser in the case of a cell phone, PDA or other wireless device, or the like, allowing a user (e.g., subscriber of the multi-tenant database system) of user system 512 to access, process and view information, pages and applications available to it from system 516 over network 514. Each user system 512 also typically includes one or more user interface devices, such as a keyboard, a mouse, touch pad, touch screen, pen or the like, for interacting with a graphical user interface (GUI) provided by the browser on a display (e.g., a monitor screen, LCD display, etc.) in conjunction with pages, forms, applications and other information provided by system 516 or other systems or servers. For example, the user interface device can be used to access data and applications hosted by system 516, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 512 and all of its components are operator configurable using applications, such as a browser, including computer code run using a central processing unit such as an Intel Core series processor or the like. Similarly, system 516 (and additional instances of an MTS, where more than one is present) and all of their components might be operator configurable using application(s) including computer code to run using a central processing unit such as processor system 517, which may include an Intel Core series processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 516 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 516 is configured to provide webpages, forms, applications, data and media content to user (client) systems 512 to support the access by user systems 512 as tenants of system 516. As such, system 516 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 6:
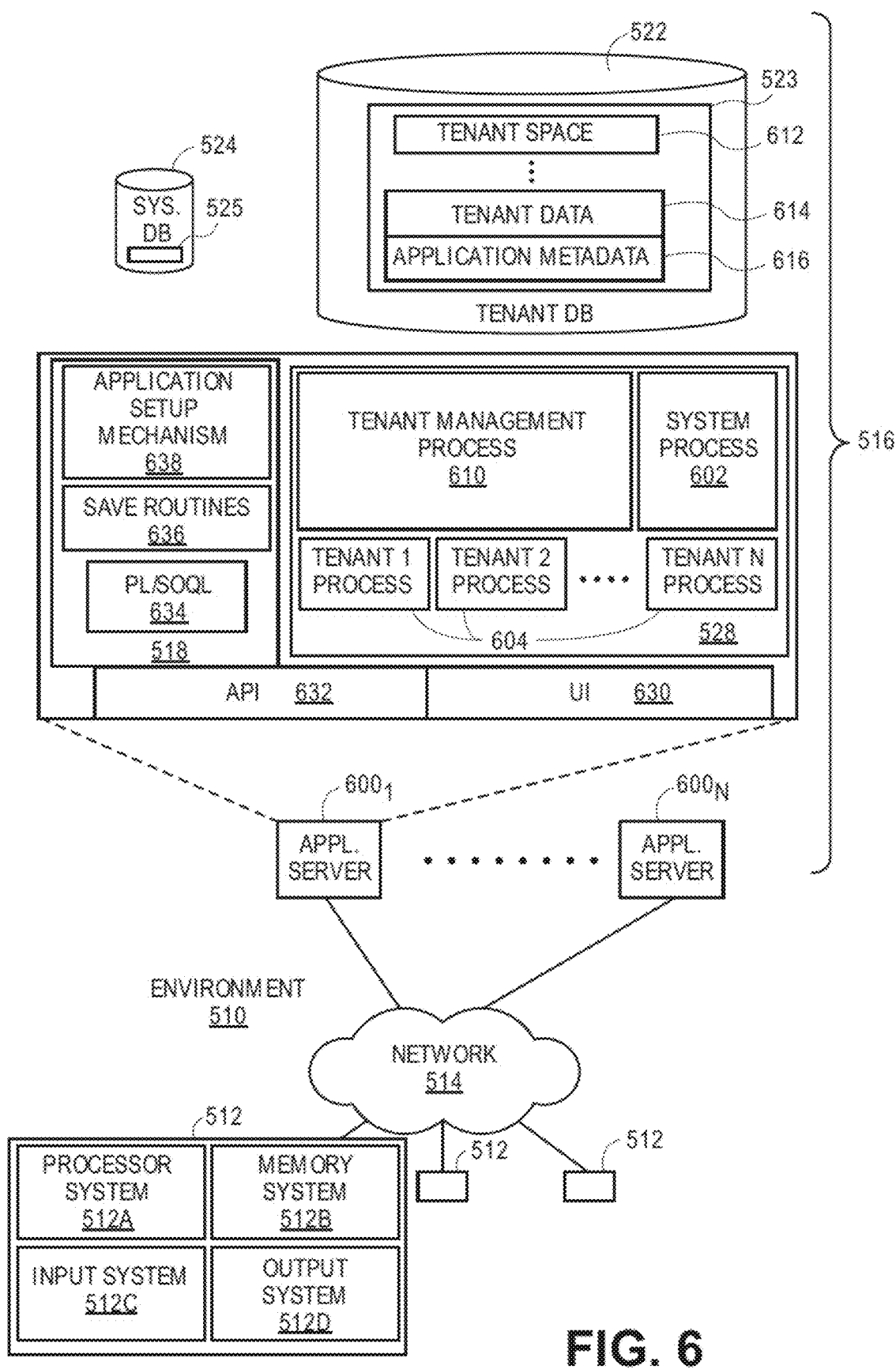
FIG. 6 illustrates a block diagram of another environment where an on-demand database service might be used.

FIG. 6 also illustrates environment 510. However, in FIG. 6 elements of system 516 and various interconnections in an embodiment are further illustrated. FIG. 6 shows that user system 512 may include processor system 512A, memory system 512B, input system 512C, and output system 512D. FIG. 6 shows network 514 and system 516. FIG. 6 also shows that system 516 may include tenant data storage 522, tenant data 523, system data storage 524, system data 525, User Interface (UI) 630, Application Program Interface (API) 632, PL/SOQL 634, save routines 636, application setup mechanism 638, applications servers $600_1$-$600_N$, system process space 602, tenant process spaces 604, tenant management process space 610, tenant storage area 612, user storage 614, and application metadata 616. In other embodiments, environment 510 may not have the same elements as those listed above and/or may have other elements instead of, or in addition to, those listed above.

User system 512, network 514, system 516, tenant data storage 522, and system data storage 524 were discussed above in FIG. 5. Regarding user system 512, processor system 512A may be any combination of one or more processors. Memory system 512B may be any combination of one or more memory devices, short term, and/or long term memory. Input system 512C may be any combination of input devices, such as one or more keyboards, mice, trackballs, scanners, cameras, and/or interfaces to networks. Output system 512D may be any combination of output devices, such as one or more monitors, printers, and/or interfaces to networks. As shown by FIG. 6, system 516 may include a network interface 520 (of FIG. 5) implemented as a set of HTTP application servers 600, an application platform 518, tenant data storage 522, and system data storage 524. Also shown is system process space 602, including individual tenant process spaces 604 and a tenant management process space 610. Each application server 600 may be configured to tenant data storage 522 and the tenant data 523 therein, and system data storage 524 and the system data 525 therein to serve requests of user systems 512. The tenant data 523 might be divided into individual tenant storage areas 612, which can be either a physical arrangement and/or a logical arrangement of data. Within each tenant storage area 612, user storage 614 and application metadata 616 might be similarly allocated for each user. For example, a copy of a user's most recently used (MRU) items might be stored to user storage 614. Similarly, a copy of MRU items for an entire organization that is a tenant might be stored to tenant storage area 612. A UI 630 provides a user interface and an API 632 provides an application programmer interface to system 516 resident processes to users and/or developers at user systems 512. The tenant data and the system data may be stored in various databases, such as one or more Oracle™ databases.

Application platform 518 includes an application setup mechanism 638 that supports application developers' creation and management of applications, which may be saved as metadata into tenant data storage 522 by save routines 636 for execution by subscribers as one or more tenant process spaces 604 managed by tenant management process 610 for example. Invocations to such applications may be coded using PL/SOQL 634 that provides a programming language style interface extension to API 632. A detailed description of some PL/SOQL language embodiments is discussed in commonly owned U.S. Pat. No. 7,730,478 entitled, "Method and System for Allowing Access to Developed Applicants via a Multi-Tenant Database On-Demand Database Service", issued Jun. 1, 2010 to Craig Weissman, which is incorporated in its entirety herein for all purposes. Invocations to applications may be detected by one or more system processes, which manage retrieving application metadata 616 for the subscriber making the invocation and executing the metadata as an application in a virtual machine.

Each application server 600 may be communicably coupled to database systems, e.g., having access to system data 525 and tenant data 523, via a different network connection. For example, one application server $600_1$ might be coupled via the network 514 (e.g., the Internet), another application server $600_{N-1}$ might be coupled via a direct network link, and another application server $600_N$ might be coupled by yet a different network connection. Transfer Control Protocol and Internet Protocol (TCP/IP) are typical protocols for communicating between application servers 600 and the database system. However, it will be apparent to one skilled in the art that other transport protocols may be used to optimize the system depending on the network interconnect used.

In certain embodiments, each application server 600 is configured to handle requests for any user associated with any organization that is a tenant. Because it is desirable to be able to add and remove application servers from the server pool at any time for any reason, there is preferably no server affinity for a user and/or organization to a specific application server 600. In one embodiment, therefore, an interface system implementing a load balancing function (e.g., an F5 BIG-IP load balancer) is communicably coupled between the application servers 600 and the user systems 512 to distribute requests to the application servers 600. In one embodiment, the load balancer uses a least connections algorithm to route user requests to the application servers 600. Other examples of load balancing algorithms, such as round robin and observed response time, also can be used. For example, in certain embodiments, three consecutive requests from the same user could hit three different application servers 600, and three requests from different users could hit the same application server 600. In this manner, system 516 is multi-tenant, wherein system 516 handles storage of, and access to, different objects, data and applications across disparate users and organizations.

As an example of storage, one tenant might be a company that employs a sales force where each salesperson uses system 516 to manage their sales process. Thus, a user might maintain contact data, leads data, customer follow-up data, performance data, goals and progress data, etc., all applicable to that user's personal sales process (e.g., in tenant data storage 522). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 516 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 516 might also maintain system level data usable by multiple tenants or other data. Such system level data might include industry reports, news, postings, and the like that are sharable among tenants.

In certain embodiments, user systems 512 (which may be client systems) communicate with application servers 600 to request and update system-level and tenant-level data from system 516 that may require sending one or more queries to tenant data storage 522 and/or system data storage 524. System 516 (e.g., an application server 600 in system 516) automatically generates one or more SQL statements (e.g., one or more SQL queries) that are designed to access the desired information. System data storage 524 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A method comprising:
   maintaining, in a database environment at least one database table of denormalized values corresponding to selected privacy characteristic values for fields in records across multiple disparate tables of the database environment, wherein the selected privacy characteristic values correspond to communication preferences for parties having entries in records in more than one of the multiple disparate tables with different object types having independent sets of permissions, preferences and privacy rules and privacy characteristics differing between the entries;
   receiving a query through a structured query language application program interface (API), the query to request a listing of records across the multiple disparate tables of the database environment that satisfy one or more privacy requirements corresponding to the selected privacy characteristic values indicating unified communication preferences for a subset of the parties that satisfy the one or more privacy requirements across the multiple disparate tables;
   searching the database table for indications corresponding to records across the multiple disparate tables to determine communication type to be allowed with the subset of the parties;
   returning, through the structured query language API, at least a listing of records from across the multiple disparate tables that satisfy the selected privacy characteristic values indicating communication types to be allowed with the subset of the parties.

2. The method of claim 1 wherein the database environment is a multitenant environment.

3. The method of claim 1 wherein the communication comprises electronic communication.

4. The method of claim 3 wherein the electronic communication comprises one or more of: processing, contacting, web tracking, email tracking, geotracking, and email contact.

5. The method of claim 3 wherein the electronic communication comprises one or more of: facsimile message contact, SMS/text messaging, telephone call.

6. The method of claim 3 wherein the electronic communication comprises one or more of: profiling, exporting data, forgetting/deleting user/profile, soliciting, storing personally identifiable information (PII) elsewhere.

7. A non-transitory computer-readable medium having stored thereon instructions that, when executed by one or more processors, are configurable to cause the one or more processors to:

maintain, in a database environment at least one database table of denormalized values corresponding to selected privacy characteristic values for fields in records across multiple disparate tables of the database environment, wherein the selected privacy characteristic values correspond to communication preferences for parties having entries in records in more than one of the multiple disparate tables with different object types having independent sets of permissions, preferences and privacy rules and privacy characteristics differing between the entries;

receive a query through a structured query language application program interface (API), the query to request a listing of records across the multiple disparate tables of the database environment that satisfy one or more privacy requirements corresponding to the selected privacy characteristic values indicating unified communication preferences for a subset of the parties that satisfy the one or more privacy requirements across the multiple disparate tables;

search the database table for indications corresponding to records across the multiple disparate tables to determine communication type to be allowed with the subset of the parties;

return, through the structured query language API, at least a listing of records from across the multiple disparate tables that satisfy the selected privacy characteristic values indicating communication types to be allowed with the subset of the parties.

8. The non-transitory computer-readable medium of claim 7 wherein the database environment is a multitenant environment.

9. The non-transitory computer-readable medium of claim 7 wherein the communication comprises electronic communication.

10. The non-transitory computer-readable medium of claim 9 wherein the electronic communication comprises one or more of: processing, contacting, web tracking, email tracking, geotracking, and email contact.

11. The non-transitory computer-readable medium of claim 9 wherein the electronic communication comprises one or more of: facsimile message contact, SMS/text messaging, telephone call.

12. The non-transitory computer-readable medium of claim 9 wherein the electronic communication comprises one or more of: profiling, exporting data, forgetting/deleting user/profile, soliciting, storing personally identifiable information (PII) elsewhere.

13. A system comprising:

a memory system having one or more memory devices;

one or more hardware processors coupled with the memory system, the one or more hardware processors configurable to maintain, in a database environment at least one database table of denormalized values corresponding to selected privacy characteristic values for fields in records across multiple disparate tables of the database environment, wherein the selected privacy characteristic values correspond to communication preferences for parties having entries in records in more than one of the multiple disparate tables with different object types having independent sets of permissions, preferences and privacy rules and privacy characteristics differing between the entries, to receive a query through a structured query language application program interface (API), the query to request a listing of records across the multiple disparate tables of the database environment that satisfy one or more privacy requirements corresponding to the selected privacy characteristic values indicating unified communication preferences for a subset of the parties that satisfy the one or more privacy requirements across the multiple disparate tables, to search the database table for indications corresponding to records across the multiple disparate tables to determine communication type to be allowed with the subset of the parties, to return, through the structured query language API, at least a listing of records from across the multiple disparate tables that satisfy the selected privacy characteristic values indicating communication types to be allowed with the subset of the parties.

14. The system of claim 13 wherein the database environment is a multitenant environment.

15. The system of claim 13 wherein the communication comprises electronic communication.

16. The system of claim 15 wherein the electronic communication comprises one or more of: processing, contacting, web tracking, email tracking, geotracking, and email contact.

17. The system of claim 15 wherein the electronic communication comprises one or more of: facsimile message contact, SMS/text messaging, telephone call.

18. The system of claim 15 wherein the electronic communication comprises one or more of: profiling, exporting data, forgetting/deleting user/profile, soliciting, storing personally identifiable information (PII) elsewhere.

* * * * *